United States Patent
Kumar

(10) Patent No.: US 11,240,825 B1
(45) Date of Patent: Feb. 1, 2022

(54) BANDWIDTH PART SELECTION FOR MULTI-SUBSCRIBER USER EQUIPMENT

(71) Applicant: QUALCOMM Incorporated, San Diego, CA (US)

(72) Inventor: Akash Kumar, Hyderabad (IN)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 17/020,448

(22) Filed: Sep. 14, 2020

(51) Int. Cl.
*H04L 5/00* (2006.01)
*H04W 72/10* (2009.01)
*H04W 68/00* (2009.01)
*H04W 88/06* (2009.01)

(52) U.S. Cl.
CPC ......... *H04W 72/10* (2013.01); *H04W 68/005* (2013.01); *H04W 88/06* (2013.01)

(58) Field of Classification Search
None
See application file for complete search history.

(56) References Cited

U.S. PATENT DOCUMENTS 9,503,950 B2 * 11/2016 Krishnamurthy ..... H04W 48/20
2021/0282104 A1 * 9/2021 Sagar .................. H04W 60/005

* cited by examiner

*Primary Examiner* — Gary Lafontant
(74) *Attorney, Agent, or Firm* — Harrity & Harrity, LLP

(57) ABSTRACT

Various aspects of the present disclosure generally relate to wireless communication. In some aspects, a user equipment (UE) may determine a frequency overlap between a first transmission, with a first base station associated with a first subscription of the UE, on a first bandwidth part, and a second transmission, with a second base station associated with a second subscription of the UE, on a second bandwidth part. The UE may transmit, to the second base station, a request for a new bandwidth part for the second subscription, based at least in part on the frequency overlap satisfying a condition. Numerous other aspects are provided.

30 Claims, 9 Drawing Sheets

BANDWIDTH PART SELECTION FOR MULTI-SUBSCRIBER USER EQUIPMENT

FIELD OF THE DISCLOSURE

Aspects of the present disclosure generally relate to wireless communication and to techniques and apparatuses for bandwidth part selection for a multi-subscriber user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: determining a frequency overlap between a first transmission, with a first base station associated with a first subscription of the UE, on a first bandwidth part (BWP), and a second transmission, with a second base station associated with a second subscription of the UE, on a second BWP; and transmitting, to the second base station, a request for a new BWP for the second subscription, based at least in part on the frequency overlap satisfying a condition.

In some aspects, a method of wireless communication performed by a base station includes: receiving, from a UE, a request for a new BWP based at least in part on a frequency overlap between a first transmission, associated with a first subscription of the UE, on a first BWP, and a second transmission, associated with a second subscription of the UE, on a second BWP; and transmitting, to the UE, a configuration for the new BWP, based at least in part on receiving the request.

In some aspects, a UE for wireless communication includes a memory and one or more processors operatively coupled to the memory, the memory and the one or more processors configured to: determine a frequency overlap between a first transmission, with a first base station associated with a first subscription of the UE, on a first BWP, and a second transmission, with a second base station associated with a second subscription of the UE, on a second BWP; and transmit, to the second base station, a request for a new BWP for the second subscription, based at least in part on the frequency overlap satisfying a condition.

In some aspects, a base station for wireless communication includes a memory and one or more processors operatively coupled to the memory, the memory and the one or more processors configured to: receive, from a UE, a request for a new BWP based at least in part on a frequency overlap between a first transmission, associated with a first subscription of the UE, on a first BWP, and a second transmission, associated with a second subscription of the UE, on a second BWP; and transmit, to the UE, a configuration for the new BWP, based at least in part on receiving the request.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
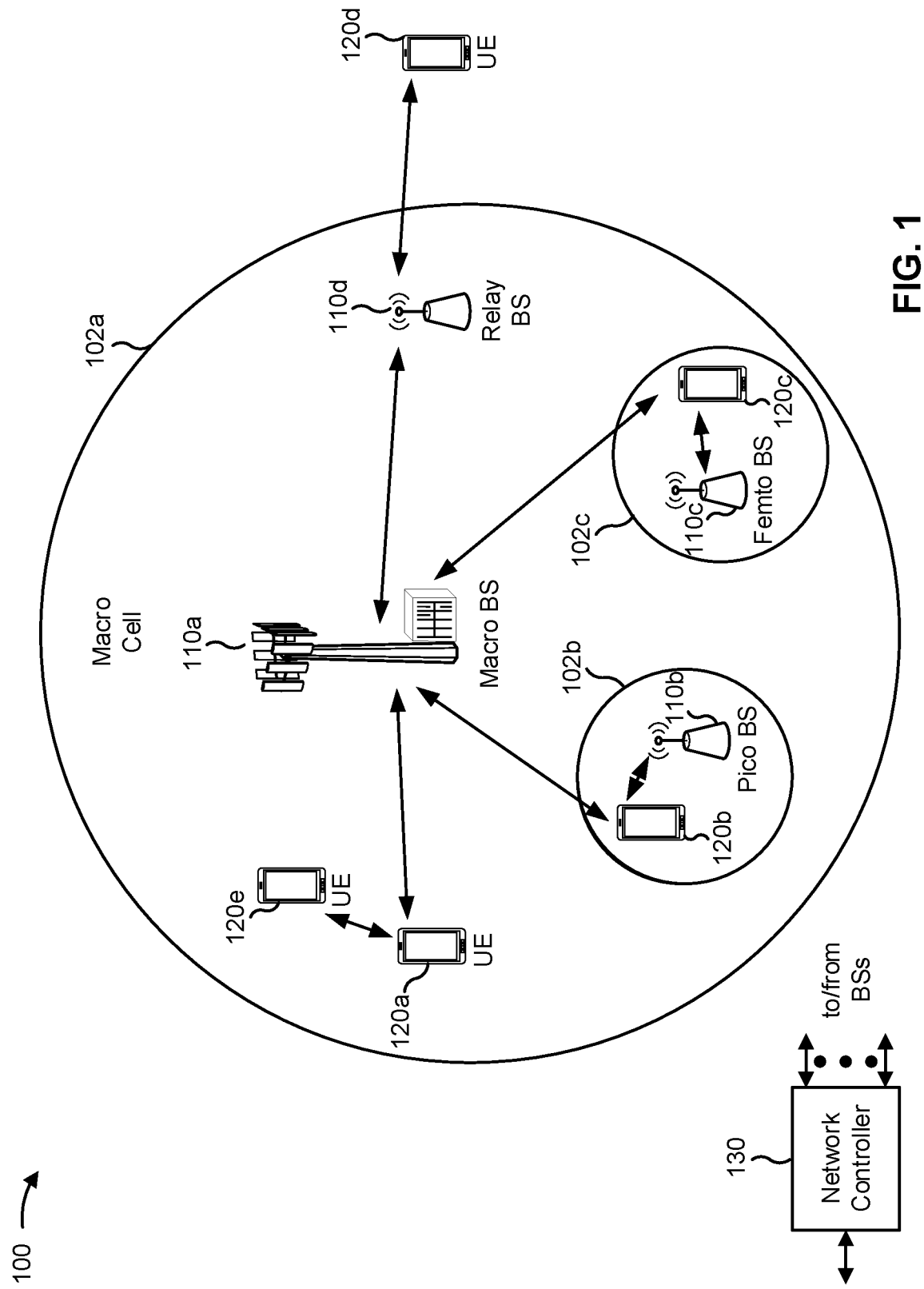
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types (e.g., macro BSs, pico BSs, femto BSs, relay BSs, and/or the like). These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another (e.g., directly or indirectly via a wireless or wireline backhaul).

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
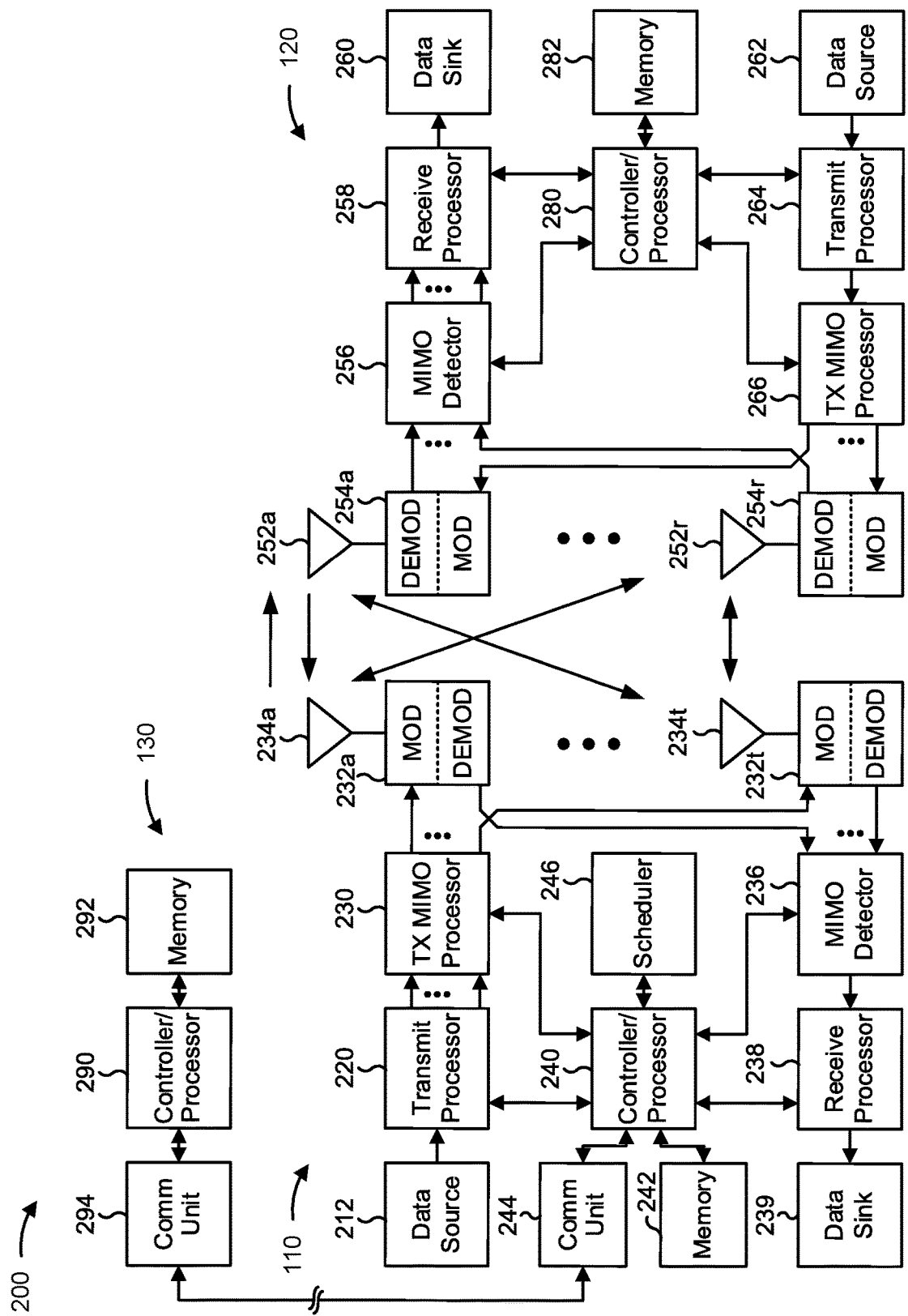
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream.

Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-7.

Controller/processor 240 of base station 110, controller/processor 280 of UE 120, and/or any other component(s) of FIG. 2 may perform one or more techniques associated with BWP selection for multi-subscriber UEs, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, interpreting the instructions, and/or the like.

In some aspects, a UE (e.g., UE 120, apparatus 800 of FIG. 8, and/or the like) may include means for determining a frequency overlap between a first transmission, with a first base station (e.g., base station 110, base station 310a, apparatus 900 of FIG. 9, and/or the like) associated with a first subscription of the UE, on a first BWP, and a second transmission, with a second base station (e.g., base station 110, base station 310b, apparatus 900 of FIG. 9, and/or the like) associated with a second subscription of the UE, on a second BWP; means for transmitting, to the second base station, a request for a new BWP for the second subscription, based at least in part on the frequency overlap satisfying a condition; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

Figure 8:
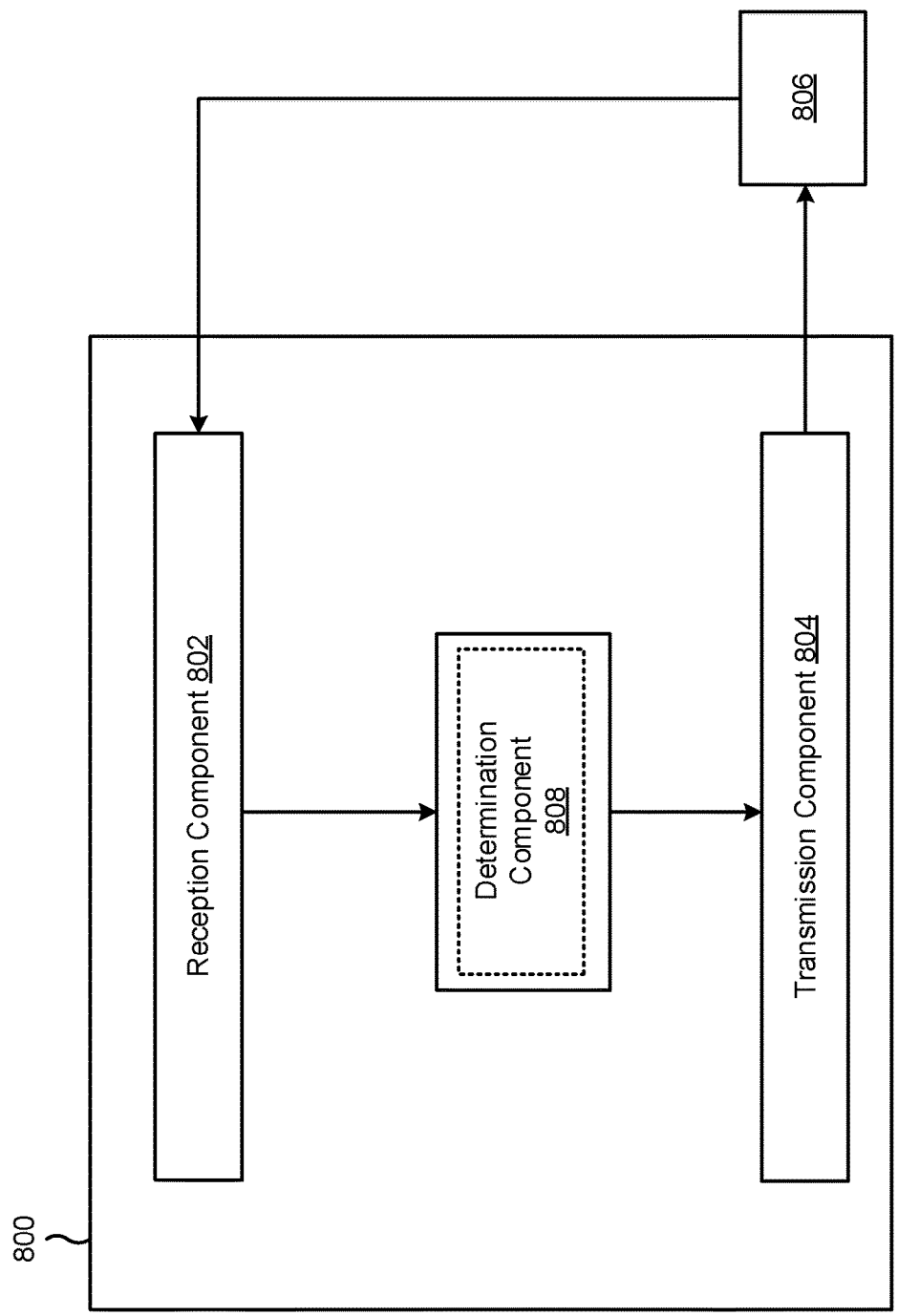
FIGS. 8 and 9 are block diagrams of example apparatuses for wireless communication, in accordance with various aspects of the present disclosure.
Figure 9:
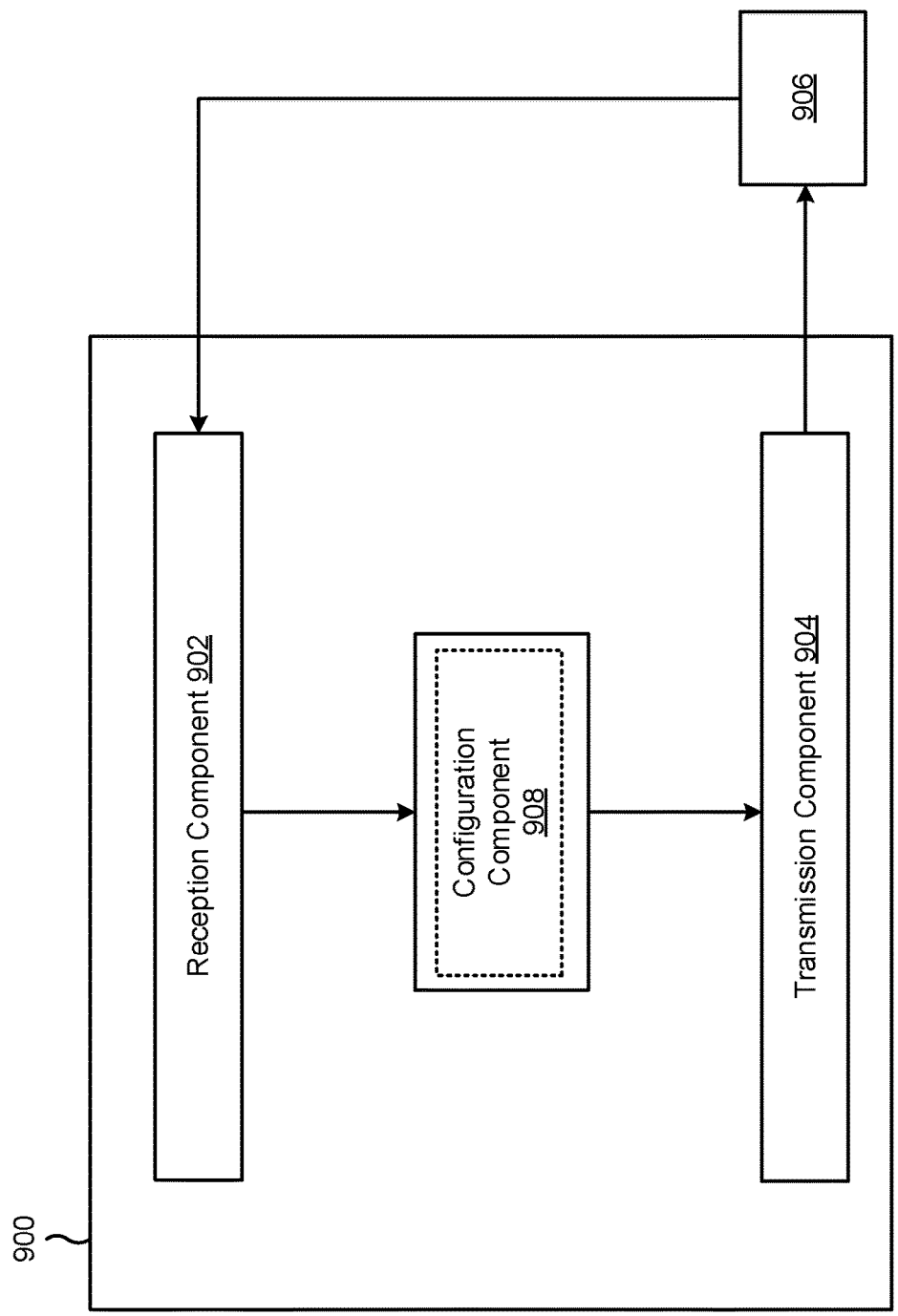

In some aspects, a base station (e.g., base station 110, base station 310a, base station 310b, apparatus 900 of FIG. 9, and/or the like) may include means for receiving, from a UE (e.g., UE 120, apparatus 800 of FIG. 8, and/or the like), a request for a new BWP based at least in part on a frequency overlap between a first transmission, associated with a first subscription of the UE, on a first BWP, and a second transmission, associated with a second subscription of the UE, on a second BWP; means for transmitting, to the UE, a configuration for the new BWP, based at least in part on receiving the request; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
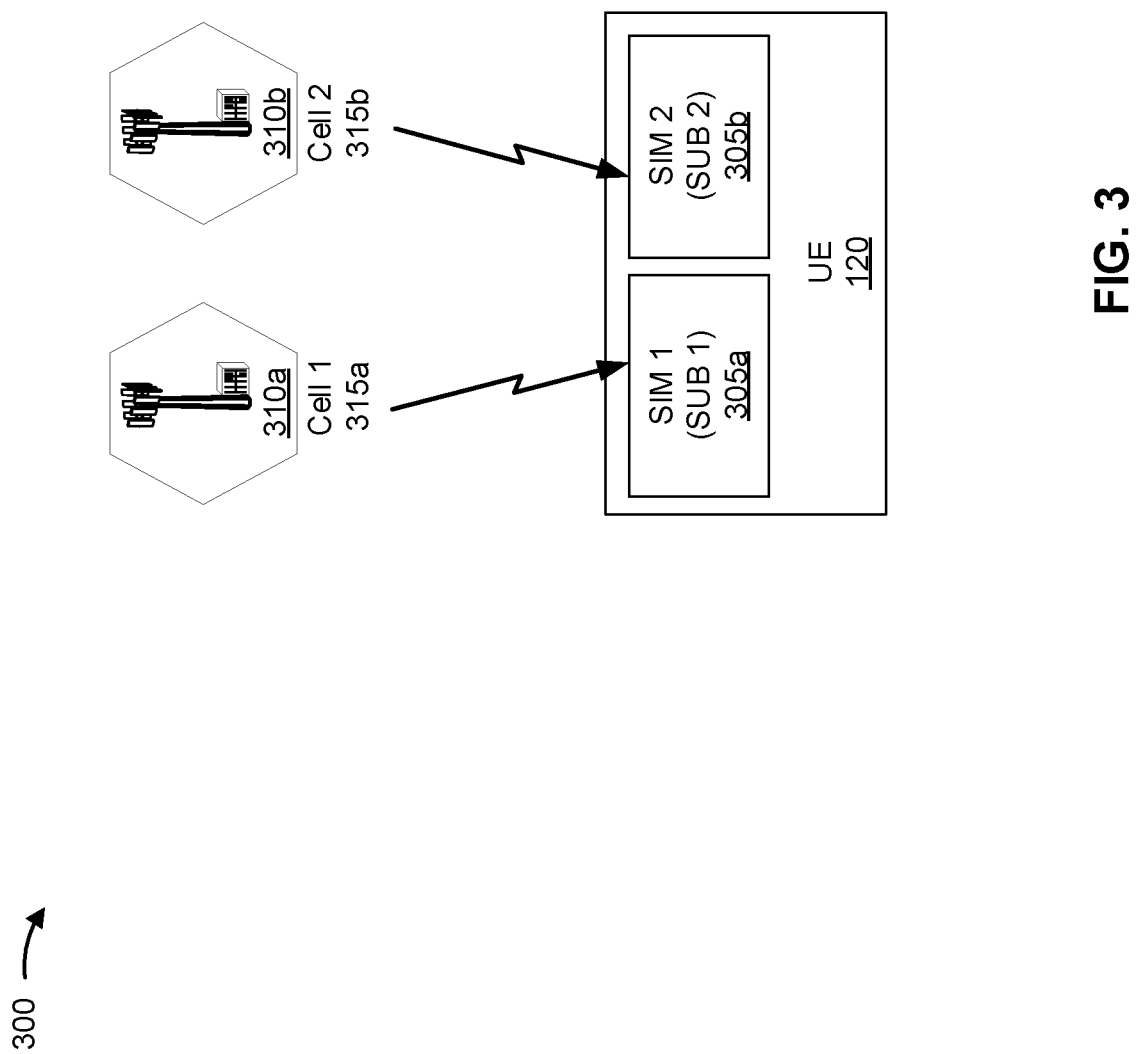
FIG. 3 is a diagram illustrating an example of a multi-subscriber identity module UE, in accordance with various aspects of the present disclosure.

FIG. 3 is a diagram illustrating an example 300 of a multiple subscriber identity module (SIM) UE, in accordance with various aspects of the present disclosure. As shown in FIG. 3, a UE 120 may be a multiple SIM (multi-SIM) UE that includes multiple SIMs (two or more SIMs), shown as a first SIM 305a and a second SIM 305b. The first SIM 305a may be associated with a first subscription (shown as SUB 1), and the second SIM 305b may be associated with a second subscription (shown as SUB 2). A subscription may include a subscription with a network operator (for example, a mobile network operator (MNO)) that enables the UE 120 to access a wireless network (for example, a radio access network (RAN)) associated with the network operator.

A SIM 305 may be a removable SIM (for example, a SIM card) or an embedded SIM. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service or a voice service, among other examples.

As further shown in FIG. 3, the UE 120 may communicate (for example, in a connected mode, an idle mode, or an inactive mode) with a first base station 310a via a first cell 315a (shown as Cell 1) using the first SIM 305a. In this case, a first subscription (SUB 1) of the UE 120 may be used to access the first cell 315a (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 310b via a second cell 315b (shown as Cell 2) using the second SIM 305b. In this case, a second subscription (SUB 2) of the UE 120 may be used to access the second cell 315b (for example, using a second IMSI for UE identification, using a second security key for UE authentication, using a second list of services that the UE 120 is permitted to access using the second subscription, or by counting data or voice usage on the second cell against the second subscription, among other examples).

The first base station 310a and/or the second base station 310b may include one or more of the base stations 110 described above in connection with FIG. 1. Although the first cell 315a and the second cell 315b are shown as being provided by different base stations, in some aspects, the first cell 315 and the second cell 315b may be provided by the same base station. Thus, in some aspects, the first base station 310a and the second base station 310b may be integrated into a single base station.

In some aspects, the UE 120 may additionally, or alternatively, communicate (for example, in a connected mode, an idle mode, or an inactive mode) with a first core network supporting the first base station 310a using the first SIM 305a. Similarly, the UE 120 may additionally, or alternatively, communicate (for example, in a connected mode, an idle mode, or an inactive mode) with a second core network supporting the second base station 310b using the second SIM 305b. The UE 120 may communicate with one or more core networks using non-access stratum (NAS) signaling.

In some cases, the UE 120 may be a single receiver (SR) (sometimes also referred to as single radio) multi-SIM UE, such as an SR multi-SIM multiple standby (SR-MSMS) UE or an SR dual SIM dual standby (SR-DSDS) UE, among other examples. A multi-SIM UE may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, an SR-DSDS UE or an SR-MSMS UE may only be capable of receiving data on one connection at a time because radio frequency resources are shared between the multiple subscriptions. For example, an SR-DSDS UE or an SR-MSMS UE may be associated with multiple subscriptions but may include only a single transceiver shared by the multiple subscriptions, a single transmit chain shared by the multiple subscriptions, or a single receive chain shared by the multiple subscriptions, among other examples. As a result, a second cell may transmit a paging message for a second subscription associated with a second SIM when the UE is communicating via a first cell using a first subscription associated with a first SIM.

In other cases, the UE 120 may be a multiple receiver (MR) (sometimes also referred to as multiple radio) multi-SIM UE, such as an MR multi-SIM multiple active (MR-MSMA) UE or an MR dual SIM dual active (MR-DSDA) UE, among other examples. A multi-SIM UE may be capable of switching between two separate mobile network services, may include hardware for maintaining multiple connections (for example, one connection per SIM) in a standby state, or may include hardware (for example, multiple transceivers) for maintaining multiple network connections at the same time, among other examples. For example, an MR-DSDA UE or an MR-MSMA UE may be associated with multiple subscriptions for different purposes (e.g., a non-standalone or standalone 5G network for data and a voice over LTE (VoLTE) or voice over New Radio (VoNR) for voice, and/or the like). As a result, a second cell may handle voice services and/or the like for a second subscription associated with a second SIM when the UE is receiving data services and/or the like via a first cell using a first subscription associated with a first SIM.

Some techniques and apparatuses described herein enable a UE 120 (e.g., a multi-SIM UE) to select different bandwidth parts (BWPs) to reduce interference between multiple subscriptions used by the UE 120. Each BWP occupies a different portion of a spectrum than other BWPs, and some BWPs may have different subcarrier spacing (SCS) and/or other network configurations than other BWPs. By dynamically selecting one or more BWPs for one or more subscriptions, the UE 120 may increase reliability and/or quality of communications within serving cells associated with the one or more subscriptions.

As indicated above, FIG. 3 is provided as an example. Other examples may differ from what is described with regard to FIG. 3.

Figure 4:
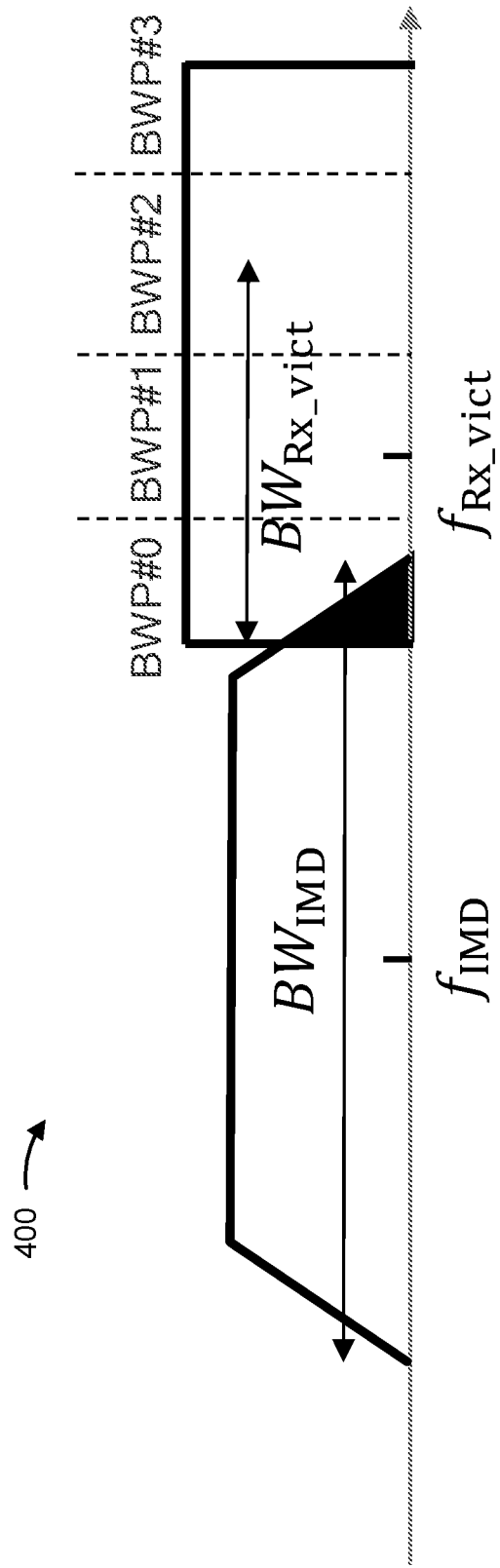
FIG. 4 is a diagram illustrating an example associated with bandwidth part (BWP) overlap for a multi-subscriber UE, in accordance with various aspects of the present disclosure.

FIG. 4 is a diagram illustrating an example 400 of BWP overlap for a multi-subscriber UE 120, in accordance with various aspects of the present disclosure. In some aspects, the UE 120 may be a multi-SIM UE that includes multiple SIMS, shown as SIM 1 (a first SIM) and SIM 2 (a second SIM) (e.g., as described above in connection with FIG. 3). As also described above, the first SIM may be associated with a first subscription, and the second SIM may be associated with a second subscription. Although the description below will focus on multiple SIMs, the description applies equally to any other techniques for associating a plurality of subscriptions with the UE 120, such as embedded SIMs, virtual SIMs, other techniques for storing different IMSIs, and/or the like. Moreover, although the description below will focus on two subscriptions, the description applies equally to any number of subscriptions for the UE 120.

As shown in FIG. 4, the UE 120 may determine a frequency overlap between a first transmission associated with the first subscription (e.g., using a frequency $f_{IMD}$) and a second transmission associated with the second subscription (e.g., using a frequency $f_{Rx\_vict}$). The frequency $f_{IMD}$ may be referred to as an aggressor frequency and the frequency $f_{Rx\_vict}$ may be referred to as a victim frequency. The frequencies $f_{IMD}$ and $f_{Rx\_vict}$ may depend, at least in part, on BWPs selected for the first subscription and the second subscription, respectively.

In some aspects, the first transmission may include a paging signal associated with a paging occasion for the first subscription in an idle mode or inactive state, and the second transmission may include a data packet for the second subscription in a connected mode. As an alternative, the first transmission may include a voice packet for the first subscription in a connected state, and the second transmission may include a data packet for the second subscription in a connected mode.

As shown in FIG. 4, a bandwidth $BW_{Rx\_vict}$ associated with the second transmission may include one or more BWPs available for communicating with a serving cell for the second subscription. In some aspects, a bandwidth $BW_{IMD}$ associated with the first transmission may be a harmonic interferer or intermodulation distortion interferer. As an alternative, the bandwidth $BW_{IMD}$ associated with the first transmission may similarly include one or more BWPs available for communicating with a serving cell for the first subscription. Although the description below will focus on four possible BWPs, the description equally applies to fewer possible BWPs (e.g., three BWPs, two BWPs, and/or the like) or to additional possible BWPs (e.g., five BWPs, six BWPs, and/or the like).

In some aspects, the UE 120 may apply a condition to evaluate frequency overlaps. For example, the condition may include a threshold amount of bandwidth. In one example, the UE 120 may determine when $$|f_{IMD} - f_{Rx\_vict}| < (BW_{IMD} + BW_{Rx\_vict})/2 - \tau \cdot BW_{Rx\_vict}$$

where $\tau$ is the threshold amount of bandwidth as a proportion of the bandwidth associated with the second transmission $BW_{Rx\_vict}$.

In some aspects, the UE 120 may determine a frequency overlap (e.g., as described above) for each symbol in the first transmission that overlaps in time with a symbol in the second transmission. For example, the UE 120 may sum, average, or otherwise combine frequency overlaps for each symbol when evaluating the combined frequency overlaps against the condition (e.g., as described above). As an alternative, the UE 120 may determine the frequency overlap (e.g., as described above) for a different evaluation period (e.g., longer than one symbol) in the first transmission that overlaps in time with the second transmission.

By using the technique described in connection with FIG. 4, the UE 120 may identify one or more BWPs that result in less frequency overlap than one or more other BWPs. Accordingly, as described in further detail in connection with FIG. 5 below, the UE 120 may select one or more BWPs that reduce interference between the first subscription and the second subscription and therefore improve quality and/or reliability of communications using both the first subscription and the second subscription.

As indicated above, FIG. 4 is provided as an example. Other examples may differ from what is described with regard to FIG. 4.

Figure 5:
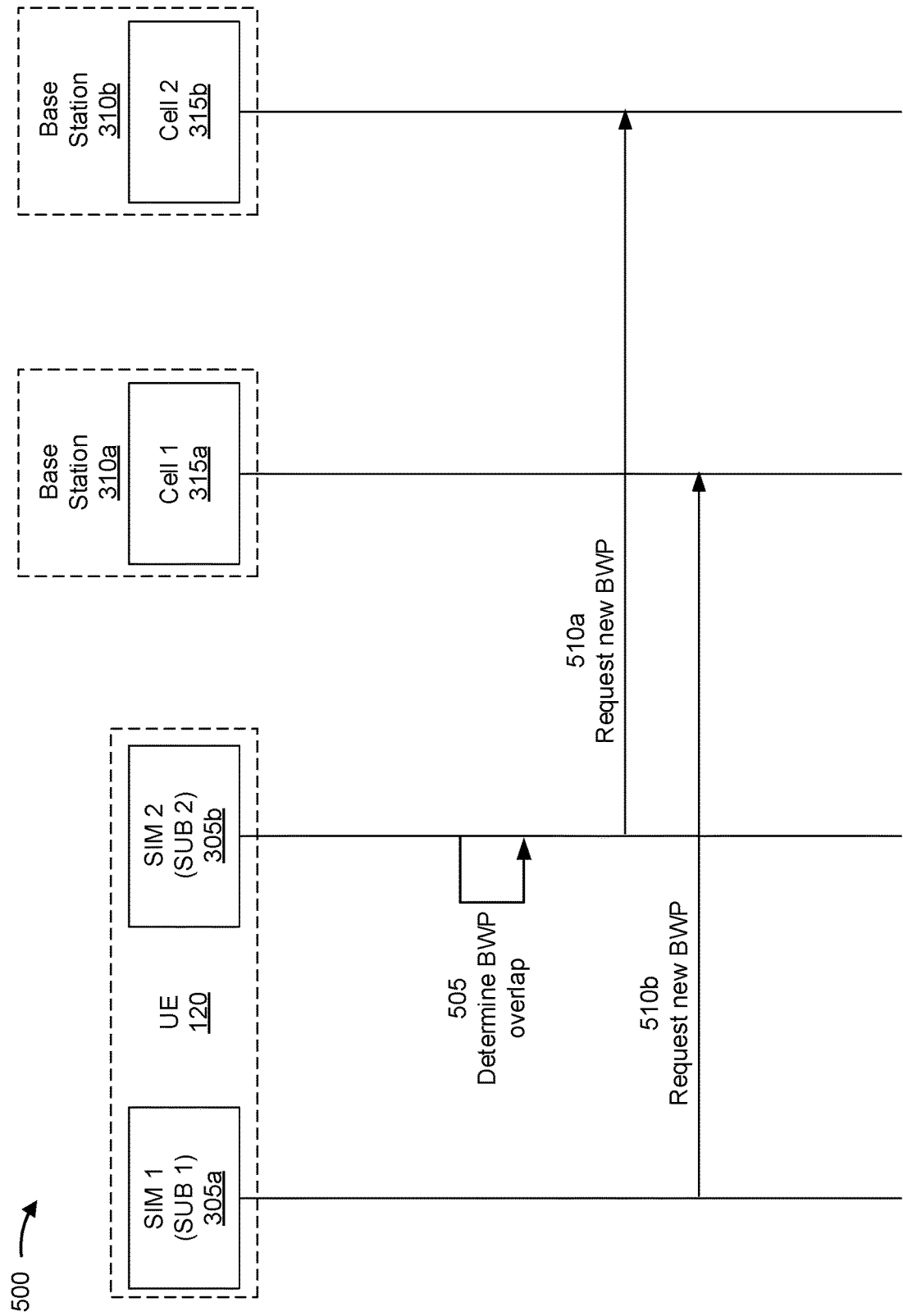
FIG. 5 is a diagram illustrating an example associated with BWP selection for a multi-subscriber UE, in accordance with various aspects of the present disclosure.

FIG. 5 is a diagram illustrating an example 500 of BWP selection for a multi-subscriber UE 120, in accordance with various aspects of the present disclosure. FIG. 5 shows an example call flow where the UE 120 determines a frequency overlap between two transmissions and requests one or more new BWPs based at least in part on the frequency overlap. As shown in FIG. 5, a UE 120 may be a multi-SIM UE that includes multiple SIMS, shown as a first SIM 305a and a second SIM 305b, as described above in connection with FIG. 3. As also described above, the first SIM 305a may be associated with a first subscription (shown as SUB 1), and the second SIM 305b may be associated with a second subscription (shown as SUB 2). Although the description below will focus on multiple SIMs, the description applies equally to any other techniques for associating a plurality of subscriptions with the UE 120, such as embedded SIMS, virtual SIMs, other techniques for storing different IMSIs, and/or the like. Moreover, although the description below will focus on two subscriptions, the description applies equally to any number of subscriptions for the UE 120.

As further shown in FIG. 5, the UE 120 may communicate with a first base station 310a via a first cell 315a (shown as Cell 1) using the first SIM 305a, and the UE 120 may communicate with a second base station 310b via a second cell 315b (shown as Cell 2) using the second SIM 305b, as described above in connection with FIG. 3. In FIG. 5, the first base station 310a and the second base station 310b are shown as separate base stations 110, but may be integrated into a single base station 110 in some aspects. Although the description below will focus on the UE 120 communicating with the first base station 310a and/or the second base station 310b, the description equally applies to the UE 120 communicating with a first core network supporting the first base station 310a and/or a second core network supporting the second base station 310b. For example, the UE 120 may communicate with the first core network and/or the second core network using non-access stratum (NAS) signaling.

As shown in connection with reference number 505, the UE 120 may determine a frequency overlap between a first transmission, with the first base station 310a associated with the first subscription SUB 1 of the UE 120, on a first BWP, and a second transmission, with the second base station 310b associated with the second subscription SUB 2 of the UE 120, on a second BWP. For example, the UE 120 may determine the frequency overlap as described above in connection with FIG. 4.

The first transmission may comprise a signal or message received from the first base station 310a or sent to the first base station 310a. Similarly, the second transmission may comprise a signal or message received from the second base station 310b or sent to the second base station 310b.

In some aspects, the first transmission may include a paging signal used for the first subscription SUB 1. Accordingly, the first BWP may include a BWP associated with a paging occasion for the first subscription SUB 1.

In some aspects, the frequency overlap is determined for each symbol in the first transmission that overlaps in time with a symbol in the second transmission. For example, as described above in connection with FIG. 4, the UE 120 may sum, average, or otherwise combine frequency overlaps for each symbol when evaluating the combined frequency overlaps against the condition (e.g., as described below in connection with reference numbers 510a and 510b).

As shown in connection with reference number 510a, the UE 120 may transmit, and the second base station 310b may receive, a request for a new BWP for the second subscription SUB 2, based at least in part on the frequency overlap satisfying a condition. Based at least in part on receiving the request, the second base station 310b may respond with a configuration for the new BWP.

In some aspects, and as described above in connection with FIG. 4, the condition may include an overlap, between a harmonic interferer or intermodulation distortion interferer associated with the first transmission and the second BWP, satisfying a threshold (e.g., a threshold τ and/or the like).

In some aspects, the UE 120 may determine one or more frequency overlaps between the first transmission and one or more candidate BWPs for the second subscription SUB 2 of the UE 120. Accordingly, the UE 120 may select the new BWP from the one or more candidate BWPs. In some aspects, the UE 120 may select the new BWP based at least in part on reducing an interference between the first transmission and the second transmission. For example, the UE 120 may select the new BWP to reduce a signal-to-noise ratio (SNR) degradation for the first transmission.

In some aspects, the UE 120 may select the new BWP based at least in part on a reference noise level and a maximum acceptable interference. For example, the UE 120 may calculate a reference noise level as $$N_{ref\_vict} = P_{Rx\_vict} - SNR_{target\_vict}$$

where $P_{Rx\_vict}$ is a transmit power associated with the second BWP for the second transmission and $SNR_{target\_vict}$ is an SNR degradation associated with a candidate BWP for the second transmission. Similarly, the UE 120 may calculate a maximum acceptable interference as $$I_{max\_vict} = N_{ref\_vict} + 10 \log_{10}(10^{\Delta SNR/10} - 1)$$

where ΔSNR is a change in SNR degradation associated with two candidate BWPs for the second transmission. Accordingly, the UE 120 may select the new BWP based at least in part on the new BWP satisfying the maximum acceptable interference (e.g., resulting in interference with the first transmission less than a threshold $I_{max\_vict}$).

In some aspects, the UE 120 may apply additional or alternative conditions to select the new BWP. For example, the UE 120 may select the new BWP based at least in part on a signal strength associated with the new BWP satisfying a threshold (e.g., being a maximum out of signal strengths associated with candidate BWPs that satisfy the maximum acceptable interference). In another example, the UE 120 may select the new BWP based at least in part on a frequency overlap with the first transmission being minimal, out of frequency overlaps associated with candidate BWPs (e.g., without using a maximum acceptable interference or other threshold). In yet another example, the UE 120 may select the new BWP based at least in part on a frequency overlap with the first transmission being minimal out of frequency overlaps associated with candidate BWPs, in combination with a signal strength associated with the new BWP satisfying a threshold (e.g., the UE 120 selecting the new BWP with the second smallest frequency overlap when the signal strength for the candidate BWP having the smallest frequency overlap does not satisfy the threshold, and/or the like).

In some aspects, the first subscription SUB 1 may be in an idle mode or an inactive state with the first base station 310a, and the second subscription may be in a connected state with the second base station 310b. Accordingly, the first subscription SUB 1 may have a single available BWP from the first base station 310a, while the second subscription SUB 2 may have a plurality of available BWPs from the second base station 310b.

As an alternative, the first subscription SUB 1 may be in a connected mode for voice with the first base station 310a, and the second subscription SUB 2 may be in a connected mode for data with the second base station 310b. Accordingly, the first subscription SUB 1 may have a plurality of available BWPs from the first base station 310a, and the second subscription SUB 2 may have a plurality of available BWPs from the second base station 310b. In some aspects, and as shown in connection with reference number 510b, the UE 120 may transmit, and the first base station 310a may receive, a request for a new BWP selected from one or more candidate BWPs for the first subscription SUB 1. Based at least in part on receiving the request, the first base station 310a may respond with a configuration for the new BWP.

In some aspects, the UE 120 may further determine one or more frequency overlaps between one or more candidate BWPs for the first subscription SUB 1 and one or more candidate BWPs for the second subscription SUB 2. For example, the UE 120 may determine the frequency overlap as described above in connection with FIG. 4.

In some aspects, as described above, the UE 120 may select the new BWP for the first subscription SUB 1 and the new BWP for the second subscription SUB 2 based at least in part on reducing an interference between the first transmission and the second transmission. For example, the UE 120 may select the new BWPs to reduce an SNR degradation for the first transmission and/or the second transmission. In some aspects, as described above, the UE 120 may select the new BWPs based at least in part on a reference noise level and a maximum acceptable interference. As further described above, the UE 120 may select the new BWPs using additional or alternative conditions.

In some aspects, the UE 120 may determine a priority for the first subscription SUB 1 that is higher than a priority for the second subscription SUB 2. In some aspects, the UE 120 may assign a priority metric (e.g., a qualitative measure, such as high or low; a quantitative measure, such as a numerical rating; or a combination thereof) to the first subscription SUB 1 and the second subscription SUB 2 based at least in part on one or more applications running on the first subscription SUB 1 and the second subscription SUB 2, respectively. For example, the first subscription SUB 1 may include a voice application, a data application more sensitive to interference than a data application running on the second subscription SUB 2, and/or the like. Accordingly, the UE 120 may select the new BWP for the first subscription and the new BWP for the second subscription based at least in part on the priority for the first subscription SUB 1. For example, the UE 120 may jointly select the new BWPs to minimize interference between the first transmission and the second transmission but prioritize the first subscription SUB 1 during the joint selection.

By using the technique described in connection with FIG. 5, the UE 120 may select one or more BWPs for SUB 2 that result in less frequency overlap with a BWP for SUB 1. Accordingly, the UE 120 may improve quality and/or reliability of communications with the base station 310a as well as with the base station 310b. In some aspects, the UE 120 may further select one or more BWPs for SUB 1 that result in less frequency overlap with the selected BWP for SUB 2.

As indicated above, FIG. 5 is provided as an example. Other examples may differ from what is described with regard to FIG. 5.

Figure 6:
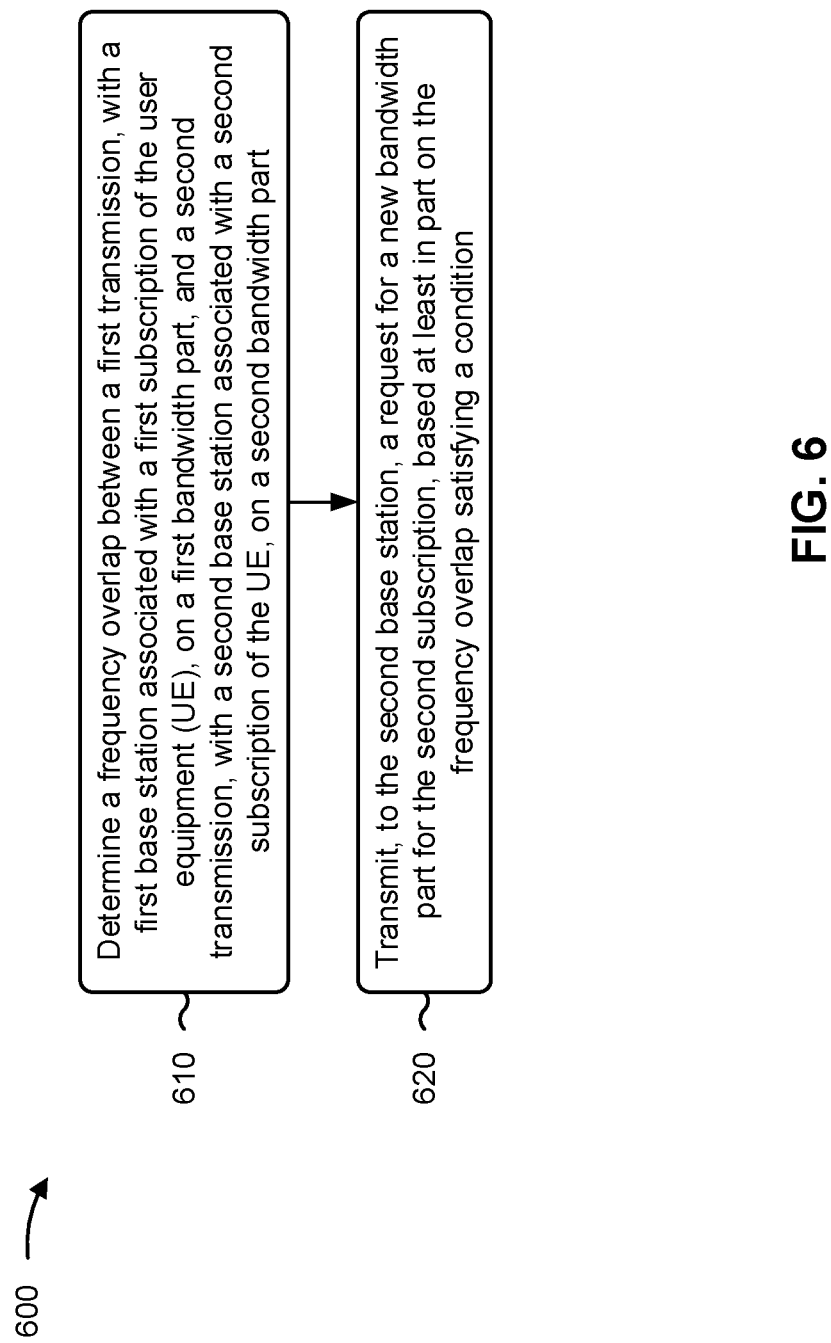
FIGS. 6 and 7 are diagrams illustrating example processes associated with BWP selection for a multi-subscriber UE, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120, apparatus 800 of FIG. 8, and/or the like) performs operations associated with BWP selection for multi-sub scriber UEs.

As shown in FIG. 6, in some aspects, process 600 may include determining a frequency overlap between a first transmission, with a first base station (e.g., base station 110, base station 310a, apparatus 900 of FIG. 9, and/or the like) associated with a first subscription of the UE, on a first BWP, and a second transmission, with a second base station (e.g., base station 110, base station 310b, apparatus 900 of FIG. 9, and/or the like) associated with a second subscription of the UE, on a second BWP (block 610). For example, the UE (e.g., using determination component 808 of FIG. 8) may determine the frequency overlap between the first transmission, to the first base station associated with the first subscription of the UE, on the first BWP, and the second transmission, to the second base station associated with the second subscription of the UE, on the second BWP, as described above.

As further shown in FIG. 6, in some aspects, process 600 may include transmitting, to the second base station, a request for a new BWP for the second subscription, based at least in part on the frequency overlap satisfying a condition (block 620). For example, the UE (e.g., using transmission component 804 of FIG. 8) may transmit, to the second base station, the request for the new BWP for the second subscription, based at least in part on the frequency overlap satisfying the condition, as described above.

Process 600 may include additional aspects, such as any single aspect or any combination of aspects described below and/or in connection with one or more other processes described elsewhere herein.

In a first aspect, the condition includes an overlap, between a harmonic interferer or intermodulation distortion interferer associated with the first transmission and the second BWP, satisfying a threshold.

In a second aspect, alone or in combination with the first aspect, the frequency overlap is determined for each symbol in the first transmission that overlaps in time with a symbol in the second transmission.

In a third aspect, alone or in combination with one or more of the first and second aspects, the first subscription is in an idle mode or an inactive state with the first base station, and the second subscription is in a connected state with the second base station.

In a fourth aspect, alone or in combination with one or more of the first through third aspects, the first transmission includes a paging signal used for the first subscription.

In a fifth aspect, alone or in combination with one or more of the first through fourth aspects, process 600 further includes determining (e.g., using determination component 808) one or more frequency overlaps between the first transmission and one or more candidate BWPs for the second subscription of the UE, the new BWP being selected from the one or more candidate BWPs.

In a sixth aspect, alone or in combination with one or more of the first through fifth aspects, the new BWP is selected based at least in part on reducing an interference between the first transmission and the second transmission.

In a seventh aspect, alone or in combination with one or more of the first through sixth aspects, the new BWP is selected based at least in part on reducing an SNR degradation for the first transmission.

In an eighth aspect, alone or in combination with one or more of the first through seventh aspects, the new BWP is selected based at least in part on a reference noise level and a maximum acceptable interference.

In a ninth aspect, alone or in combination with one or more of the first through eighth aspects, the first subscription is in a connected mode for voice with the first base station, and the second subscription is in a connected mode for data with the second base station.

In a tenth aspect, alone or in combination with one or more of the first through ninth aspects, process 600 further includes determining (e.g., using determination component 808) frequency overlaps between one or more candidate BWPs for the first subscription and one or more candidate BWPs for the second subscription, and transmitting (e.g., using transmission component 804), to the first base station associated with the first subscription of the UE, a request for a new BWP selected from the one or more candidate BWPs for the first subscription.

In an eleventh aspect, alone or in combination with one or more of the first through tenth aspects, the new BWP for the first subscription is selected based at least in part on reducing an interference between the first transmission and the second transmission.

In a twelfth aspect, alone or in combination with one or more of the first through eleventh aspects, the new BWP for the first subscription is selected based at least in part on a reference noise level and a maximum acceptable interference.

In a thirteenth aspect, alone or in combination with one or more of the first through twelfth aspects, process 600 further includes determining (e.g., using determination component 808) a priority for the first subscription that is higher than a priority for the second subscription, the new BWP for the first subscription and the new BWP for the second subscription being selected based at least in part on the priority for the first subscription.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
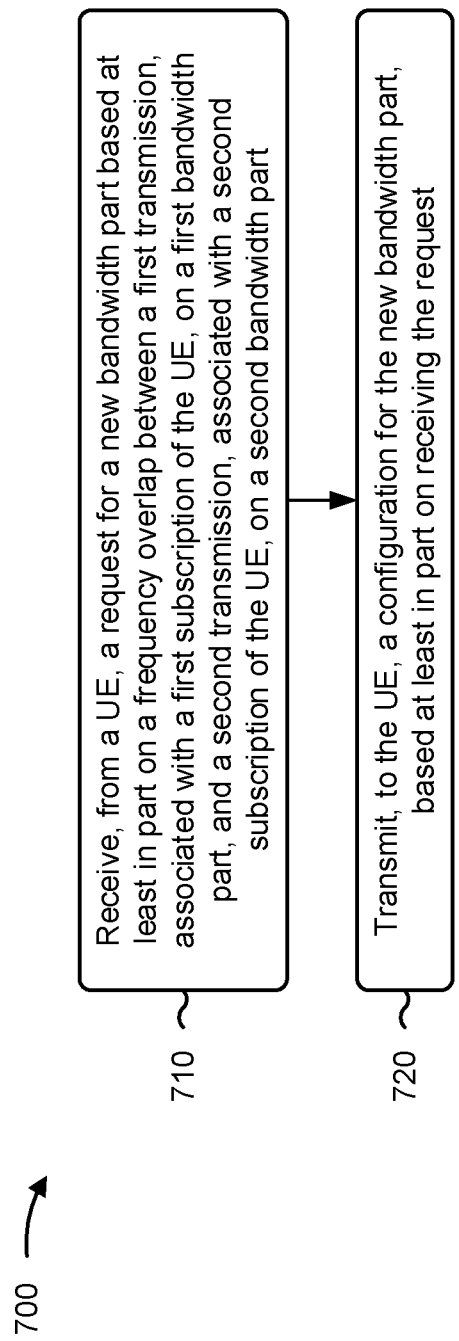

FIG. 7 is a diagram illustrating an example process 700 performed, for example, by a base station, in accordance with various aspects of the present disclosure. Example process 700 is an example where the base station (e.g., base station 110, base station 310a, base station 310b, apparatus 900 of FIG. 9, and/or the like) performs operations associated with BWP selection for multi-subscriber UEs.

As shown in FIG. 7, in some aspects, process 700 may include receiving, from a UE (e.g., UE 120, apparatus 800 of FIG. 8, and/or the like), a request for a new BWP based at least in part on a frequency overlap between a first transmission, associated with a first subscription of the UE, on a first BWP, and a second transmission, associated with a second subscription of the UE, on a second BWP (block 710). For example, the base station (e.g., using reception component 902 of FIG. 9) may receive, from the UE, the request for the new BWP based at least in part on the frequency overlap between the first transmission, associated with the first subscription of the UE, on the first BWP, and the second transmission, associated with the subscription of the UE, on the second BWP, as described above.

As further shown in FIG. 7, in some aspects, process 700 may include transmitting, to the UE, a configuration for the new BWP, based at least in part on receiving the request (block 720). For example, the base station (e.g., using transmission component 904 of FIG. 9) may transmit, to the UE, the configuration for the new BWP, based at least in part on receiving the request, as described above.

Process 700 may include additional aspects, such as any single aspect or any combination of aspects described below and/or in connection with one or more other processes described elsewhere herein.

In a first aspect, the first subscription is in an idle mode or an inactive state, and the second subscription is in a connected state with the base station.

In a second aspect, alone or in combination with the first aspect, the first transmission includes a paging signal used for the first subscription.

In a third aspect, alone or in combination with one or more of the first and second aspects, the new BWP is selected from one or more candidate BWPs configured by the base station.

In a fourth aspect, alone or in combination with one or more of the first through third aspects, the first subscription is in a connected mode for voice, and the second subscription is in a connected mode for data with the base station.

In a fifth aspect, alone or in combination with one or more of the first through fourth aspects, the first subscription is in a connected mode for voice with the base station, and the second subscription is in a connected mode for data.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808, among other examples.

In some aspects, the apparatus 800 may be configured to perform one or more operations described herein in connection with FIGS. 4-5. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be collocated with the reception component 802 in a transceiver.

In some aspects, the determination component 808 may determine a frequency overlap between a first transmission, with a first base station (e.g., base station 110, base station 310a, apparatus 806, and/or the like) associated with a first subscription of the apparatus 800, on a first BWP, and a second transmission, with a second base station (e.g., base station 110, base station 310b, apparatus 806, and/or the like) associated with a second subscription of the apparatus 800, on a second BWP. In some aspects, the determination component 808 may include a MIMO detector, a receive processor, a modulator, a transmit MIMO processor, a transmit processor, a controller/processor, a memory, or a combination thereof, of the UE described above in connection with FIG. 2. The transmission component 804 may transmit, to the second base station, a request for a new BWP for the second subscription, based at least in part on the frequency overlap satisfying a condition.

In some aspects, the determination component 808 may determine one or more frequency overlaps between the first transmission and one or more candidate BWPs for the second subscription of the apparatus 800. Accordingly, the determination component 808 may select the new BWP from the one or more candidate BWPs.

In some aspects, the determination component 808 may determine frequency overlaps between one or more candidate BWPs for the first subscription and one or more candidate BWPs for the second subscription. Accordingly, the transmission component 804 may transmit, to the first base station associated with the first subscription of the apparatus 800, a request for a new BWP selected from the one or more candidate BWPs for the first subscription.

In some aspects, the determination component 808 may determine a priority for the first subscription that is higher than a priority for the second subscription. Accordingly, the determination component 808 may select the new BWP for the first subscription and the new BWP for the second subscription based at least in part on the priority for the first subscription.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a configuration component 908, among other examples.

In some aspects, the apparatus 900 may be configured to perform one or more operations described herein in connection with FIGS. 4-5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be collocated with the reception component 902 in a transceiver.

In some aspects, the reception component 902 may receive, from a UE (e.g., UE 120, apparatus 906, and/or the like), a request for a new BWP based at least in part on a frequency overlap between a first transmission, associated with a first subscription of the UE, on a first BWP, and a second transmission, associated with a second subscription of the UE, on a second BWP. The transmission component 904 may transmit, to the UE, a configuration for the new BWP, based at least in part on the reception component 902 receiving the request. For example, the configuration component 908 may configure the new BWP based at least in part on the request. In some aspects, the configuration component 908 may include a MIMO detector, a receive processor, a controller/processor, a memory, or a combination thereof, of the base station described above in connection with FIG. 2.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    determining a frequency overlap between a first transmission, with a first base station associated with a first subscription of the UE, on a first bandwidth part, and a second transmission, with a second base station associated with a second subscription of the UE, on a second bandwidth part; and
    transmitting, to the second base station, a request for a new bandwidth part for the second subscription, based at least in part on the frequency overlap satisfying a condition.

2. The method of claim 1, wherein the condition includes an overlap, between a harmonic interferer or intermodulation distortion interferer associated with the first transmission and the second bandwidth part, satisfying a threshold.

3. The method of claim 1, wherein the frequency overlap is determined for each symbol in the first transmission that overlaps in time with a symbol in the second transmission.

4. The method of claim 1, wherein the first subscription is in an idle mode or an inactive state with the first base station, and the second subscription is in a connected state with the second base station.

5. The method of claim 4, wherein the first transmission includes a paging signal used for the first subscription.

6. The method of claim 4, further comprising:
    determining one or more frequency overlaps between the first transmission and one or more candidate bandwidth parts for the second subscription of the UE,
    wherein the new bandwidth part is selected from the one or more candidate bandwidth parts.

7. The method of claim 6, wherein the new bandwidth part is selected based at least in part on reducing an interference between the first transmission and the second transmission.

8. The method of claim 6, wherein the new bandwidth part is selected based at least in part on reducing a signal-to-noise ratio degradation for the first transmission.

9. The method of claim 6, wherein the new bandwidth part is selected based at least in part on a reference noise level and a maximum acceptable interference.

10. The method of claim 1, wherein the first subscription is in a connected mode for voice with the first base station, and the second subscription is in a connected mode for data with the second base station.

11. The method of claim 10, further comprising:
    determining frequency overlaps between one or more candidate bandwidth parts for the first subscription and one or more candidate bandwidth parts for the second subscription; and
    transmitting, to the first base station associated with the first subscription of the UE, a request for a new bandwidth part selected from the one or more candidate bandwidth parts for the first subscription.

12. The method of claim 11, wherein the new bandwidth part for the first subscription is selected based at least in part on reducing an interference between the first transmission and the second transmission.

13. The method of claim 11, wherein the new bandwidth part for the first subscription is selected based at least in part on a reference noise level and a maximum acceptable interference.

14. The method of claim 11, further comprising:
    determining a priority for the first subscription that is higher than a priority for the second subscription,
    wherein the new bandwidth part for the first subscription and the new bandwidth part for the second subscription are selected based at least in part on the priority for the first subscription.

15. A method of wireless communication performed by a base station, comprising:
    receiving, from a user equipment (UE), a request for a new bandwidth part based at least in part on a frequency overlap between a first transmission, associated with a first subscription of the UE, on a first bandwidth part, and a second transmission, associated with a second subscription of the UE, on a second bandwidth part; and
    transmitting, to the UE, a configuration for the new bandwidth part, based at least in part on receiving the request.

16. The method of claim 14, wherein the first subscription is in an idle mode or an inactive state, and the second subscription is in a connected state with the base station.

17. The method of claim 15, wherein the first transmission includes a paging signal used for the first subscription.

18. The method of claim 14, wherein the new bandwidth part is selected from one or more candidate bandwidth parts configured by the base station.

19. The method of claim 14, wherein the first subscription is in a connected mode for voice, and the second subscription is in a connected mode for data with the base station.

20. The method of claim 14, wherein the first subscription is in a connected mode for voice with the base station, and the second subscription is in a connected mode for data.

21. A user equipment (UE) for wireless communication, comprising:
a memory; and
one or more processors operatively coupled to the memory, the memory and the one or more processors configured to:
determine a frequency overlap between a first transmission, with a first base station associated with a first subscription of the UE, on a first bandwidth part, and a second transmission, with a second base station associated with a second subscription of the UE, on a second bandwidth part; and
transmit, to the second base station, a request for a new bandwidth part for the second subscription, based at least in part on the frequency overlap satisfying a condition.

22. The user equipment of claim 21, wherein the condition includes an overlap, between a harmonic interferer or intermodulation distortion interferer associated with the first transmission and the second bandwidth part, satisfying a threshold.

23. The user equipment of claim 21, wherein the first subscription is in an idle mode or an inactive state with the first base station, and the second subscription is in a connected state with the second base station.

24. The user equipment of claim 23, wherein the first transmission includes a paging signal used for the first subscription.

25. The user equipment of claim 23, wherein the one or more processors are further configured to:
determine one or more frequency overlaps between the first transmission and one or more candidate bandwidth parts for the second subscription of the UE,
wherein the new bandwidth part is selected from the one or more candidate bandwidth parts.

26. The user equipment of claim 25, wherein the new bandwidth part is selected based at least in part on reducing an interference between the first transmission and the second transmission.

27. The user equipment of claim 25, wherein the new bandwidth part is selected based at least in part on reducing a signal-to-noise ratio degradation for the first transmission.

28. The user equipment of claim 21, wherein the first subscription is in a connected mode for voice with the first base station, and the second subscription is in a connected mode for data with the second base station.

29. The user equipment of claim 28, wherein the one or more processors are further configured to:
determine frequency overlaps between one or more candidate bandwidth parts for the first subscription and one or more candidate bandwidth parts for the second subscription; and
transmit, to the first base station associated with the first subscription of the UE, a request for a new bandwidth part selected from the one or more candidate bandwidth parts for the first subscription.

30. A base station for wireless communication, comprising:
a memory; and
one or more processors operatively coupled to the memory, the memory and the one or more processors configured to:
receive, from a user equipment (UE), a request for a new bandwidth part based at least in part on a frequency overlap between a first transmission, associated with a first subscription of the UE, on a first bandwidth part, and a second transmission, associated with a second subscription of the UE, on a second bandwidth part; and
transmit, to the UE, a configuration for the new bandwidth part, based at least in part on receiving the request.

* * * * *